US011995987B2

(12) United States Patent
Hayashi et al.

(10) Patent No.: US 11,995,987 B2
(45) Date of Patent: May 28, 2024

(54) APPARATUS AND SYSTEM FOR PARKING POSITION FOR VEHICLE PICK-UP OR DROP-OFF

(71) Applicant: TOYOTA JIDOSHA KABUSHIKI KAISHA, Toyota (JP)

(72) Inventors: Yasuhiro Hayashi, Mitaka (JP); Kazunori Fujimori, Nagoya (JP); Takuji Yamada, Musashino (JP); Naoya Oka, Nagakute (JP); Daisuke Kimura, Toyota (JP); Yumiko Yamashita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 17/517,078

(22) Filed: Nov. 2, 2021

(65) Prior Publication Data

US 2022/0157169 A1 May 19, 2022

(30) Foreign Application Priority Data

Nov. 19, 2020 (JP) ................................ 2020-192389

(51) Int. Cl.
*G08G 1/14* (2006.01)
*G08G 1/00* (2006.01)

(52) U.S. Cl.
CPC ............ *G08G 1/147* (2013.01); *G08G 1/202* (2013.01)

(58) Field of Classification Search
CPC ........ G08G 1/147; G08G 1/143; G08G 1/202; G08G 1/0968; G08G 1/148
See application file for complete search history.

(56) References Cited

U.S. PATENT DOCUMENTS

| | | | | |
|---|---|---|---|---|
| 9,911,084 | B2 * | 3/2018 | Bryson | G01C 21/206 |
| 10,984,499 | B2 * | 4/2021 | Seki | H04W 4/029 |
| 11,092,449 | B2 * | 8/2021 | Rong | G06Q 10/02 |
| 11,262,205 | B2 * | 3/2022 | Kamata | G01C 21/3605 |
| 11,370,437 | B2 * | 6/2022 | Sakai | G05D 1/021 |
| 11,614,738 | B2 * | 3/2023 | Mukaiyama | G08G 1/0137 701/23 |
| 11,676,396 | B2 * | 6/2023 | Takato | G06V 20/586 382/104 |
| 11,853,942 | B2 * | 12/2023 | Anderson | G06Q 50/40 |
| 2020/0097007 | A1 * | 3/2020 | Dyer | B60W 60/0027 |
| 2020/0240808 | A1 * | 7/2020 | Beaurepaire | G01C 21/3461 |

FOREIGN PATENT DOCUMENTS

JP 2009-244032 A 10/2009

* cited by examiner

*Primary Examiner* — John A Tweel, Jr.
(74) *Attorney, Agent, or Firm* — Oblon, McClelland, Maier & Neustadt, L.L.P.

(57) ABSTRACT

An information processing apparatus comprises a controller configured to: receive vehicle data from a plurality of vehicles, specify a first vehicle, among the plurality of vehicles, that is predicted to be parked to pick up or drop off a person in a predetermined period of time, based on the vehicle data, make a determination, based on the vehicle data, whether the first vehicle is in a first state in which parking for pick-up of the person is predicted to be performed or a second state in which parking for drop-off of the person is predicted to be performed, and perform assignment of a parking position to the first vehicle based on a result of the determination.

20 Claims, 17 Drawing Sheets

PARKING REGION TABLE

| PARKING REGION ID | POSITION INFORMATION | EVALUATION VALUE | … |
|---|---|---|---|
| R001 | … | … | … |
| R002 | … | … | … |
| R003 | … | … | … |
| … | … | … | … |

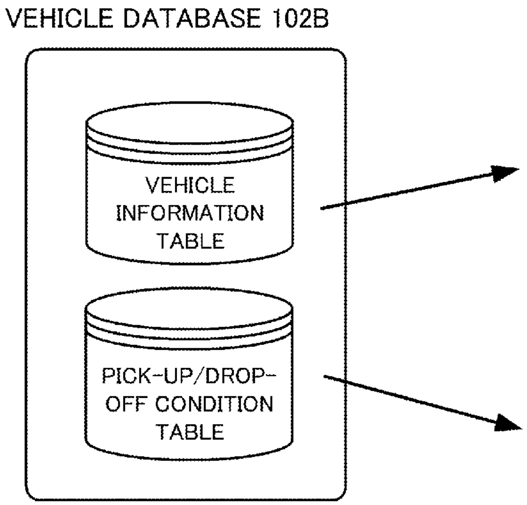

VEHICLE INFORMATION TABLE

| VEHICLE ID | DATE/TIME INFORMATION | POSITION INFORMATION | DESTINATION | NUMBER OF OCCUPANTS |
|---|---|---|---|---|
| V001 | 12:00:00 | (Latitude, Longitude) | (IDENTIFIER) | ... |
| V001 | 12:01:00 | (Latitude, Longitude) | (IDENTIFIER) | ... |
| V001 | 12:02:00 | (Latitude, Longitude) | (IDENTIFIER) | ... |
| ... | ... | ... | ... | ... |

PICK-UP/DROP-OFF CONDITION TABLE

| VEHICLE ID | CONDITIONS | DESTINATION | OPERATION TYPE | NUMBER OF OCCUPANTS |
|---|---|---|---|---|
| V001 | TUESDAY 16:00-16:59 | (IDENTIFIER) | DROP-OFF | 2 PERSONS |
| V001 | TUESDAY 19:00-19:59 | (IDENTIFIER) | PICK-UP | 1 PERSON |
| V001 | FRIDAY 16:00-16:59 | (IDENTIFIER) | DROP-OFF | 3 PERSONS |
| V001 | FRIDAY 18:00-18:59 | (IDENTIFIER) | PICK-UP | 2 PERSONS |
| ... | ... | ... | ... | ... |

FIG. 6

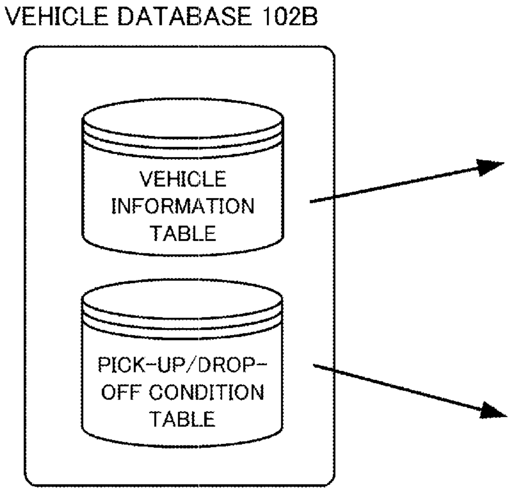

VEHICLE INFORMATION TABLE

| VEHICLE ID | DATE/TIME INFORMATION | POSITION INFORMATION | DESTINATION | NUMBER OF OCCUPANTS |
|---|---|---|---|---|
| V001 | 12:00:00 | (Latitude, Longitude) | (IDENTIFIER) | ... |
| V001 | 12:01:00 | (Latitude, Longitude) | (IDENTIFIER) | ... |
| V001 | 12:02:00 | (Latitude, Longitude) | (IDENTIFIER) | ... |
| ... | ... | ... | ... | ... |

PICK-UP/DROP-OFF CONDITION TABLE

| VEHICLE ID | CONDITIONS | DESTINATION | OPERATION TYPE | NUMBER OF OCCUPANTS | MOBILE TERMINAL ID |
|---|---|---|---|---|---|
| V001 | TUESDAY 16:00-16:59 | (IDENTIFIER) | DROP-OFF | 2 PERSONS | T001 |
| V001 | TUESDAY 19:00-19:59 | (IDENTIFIER) | PICK-UP | 1 PERSON | T001 |
| V001 | FRIDAY 16:00-16:59 | (IDENTIFIER) | DROP-OFF | 3 PERSONS | T002 |
| V001 | FRIDAY 18:00-18:59 | (IDENTIFIER) | PICK-UP | 2 PERSONS | T002 |
| ... | ... | ... | ... | ... | ... |

FIG. 13

APPARATUS AND SYSTEM FOR PARKING POSITION FOR VEHICLE PICK-UP OR DROP-OFF

CROSS REFERENCE TO THE RELATED APPLICATION

This application claims the benefit of Japanese Patent Application No. 2020-192389, filed on Nov. 19, 2020, which is hereby incorporated by reference herein in its entirety.

BACKGROUND

Technical Field

The present disclosure relates to a vehicle navigation technology.

Description of the Related Art

There are technologies for supporting pick-up and drop-off by a vehicle.

For example, Japanese Patent Laid-Open No. 2009-244032 discloses a system that determines whether a travel purpose of a vehicle is “drop-off” or “pick-up”, and that provides a service to the vehicle based on the determination result. With this system, for example, information about how far apart a position where one got off a vehicle and a position where a vehicle for pick-up arrived are may be provided to a person who is to get on or off the vehicle.

SUMMARY

A plurality of vehicles may gather near a facility such as a school or other education facility for the purpose of picking up or dropping off a person. When people get on or off such vehicles on a road, other traffic may be obstructed.

The present disclosure has been made in view of such a situation, and is aimed at assigning an appropriate parking position to a vehicle that is to be temporarily parked to pick up or drop off a person.

The present disclosure in another aspect provides an information processing apparatus comprising a controller configured to: receive vehicle data from a plurality of vehicles, specify a first vehicle, among the plurality of vehicles, that is predicted to be parked to pick up or drop off a person in a predetermined period of time, based on the vehicle data, make a determination, based on the vehicle data, whether the first vehicle is in a first state in which parking for pick-up of the person is predicted to be performed or a second state in which parking for drop-off of the person is predicted to be performed, and perform assignment of a parking position to the first vehicle based on a result of the determination.

The present disclosure in one aspect provides an information processing system comprising a plurality of in-vehicle apparatuses mounted in a plurality of vehicles, respectively, and a server apparatus, wherein the in-vehicle apparatuses each include a first controller configured to transmit vehicle data to the server apparatus, and output information that is received from the server apparatus, and the server apparatus includes a second controller configured to receive the vehicle data from the in-vehicle apparatus, specify a first vehicle, among the plurality of vehicles, that is predicted to be parked to pick up or drop off a person in a predetermined period of time, based on the vehicle data, make a determination, based on the vehicle data, whether the first vehicle is in a first state in which parking for pick-up of the person is predicted to be performed or a second state in which parking for drop-off of the person is predicted to be performed, perform assignment of a parking position to the first vehicle based on a result of the determination, and transmit a result of the assignment to the in-vehicle apparatus.

The present disclosure in another aspect provides an information processing method comprising: receiving vehicle data from a plurality of vehicles; specifying a first vehicle, among the plurality of vehicles, that is predicted to be parked to pick up or drop off a person in a predetermined period of time, based on the vehicle data; making a determination, based on the vehicle data, whether the first vehicle is in a first state in which parking for pick-up of the person is predicted to be performed or a second state in which parking for drop-off of the person is predicted to be performed; and performing assignment of a parking position to the first vehicle based on a result of the determination.

Furthermore, another mode of the present disclosure is a program for causing a computer to perform the information processing method described above, or a non-transitory computer-readable storage medium storing the program.

According to the present disclosure, an appropriate parking position may be assigned to a vehicle that is to be temporarily parked to pick up or drop off a person.

BRIEF DESCRIPTION OF THE DRAWINGS

FIG. 6 is an example of a vehicle database that is stored in the storage unit;

FIG. 13 is an example of a vehicle database in the third embodiment; and

DESCRIPTION OF THE EMBODIMENTS

Figure 1:
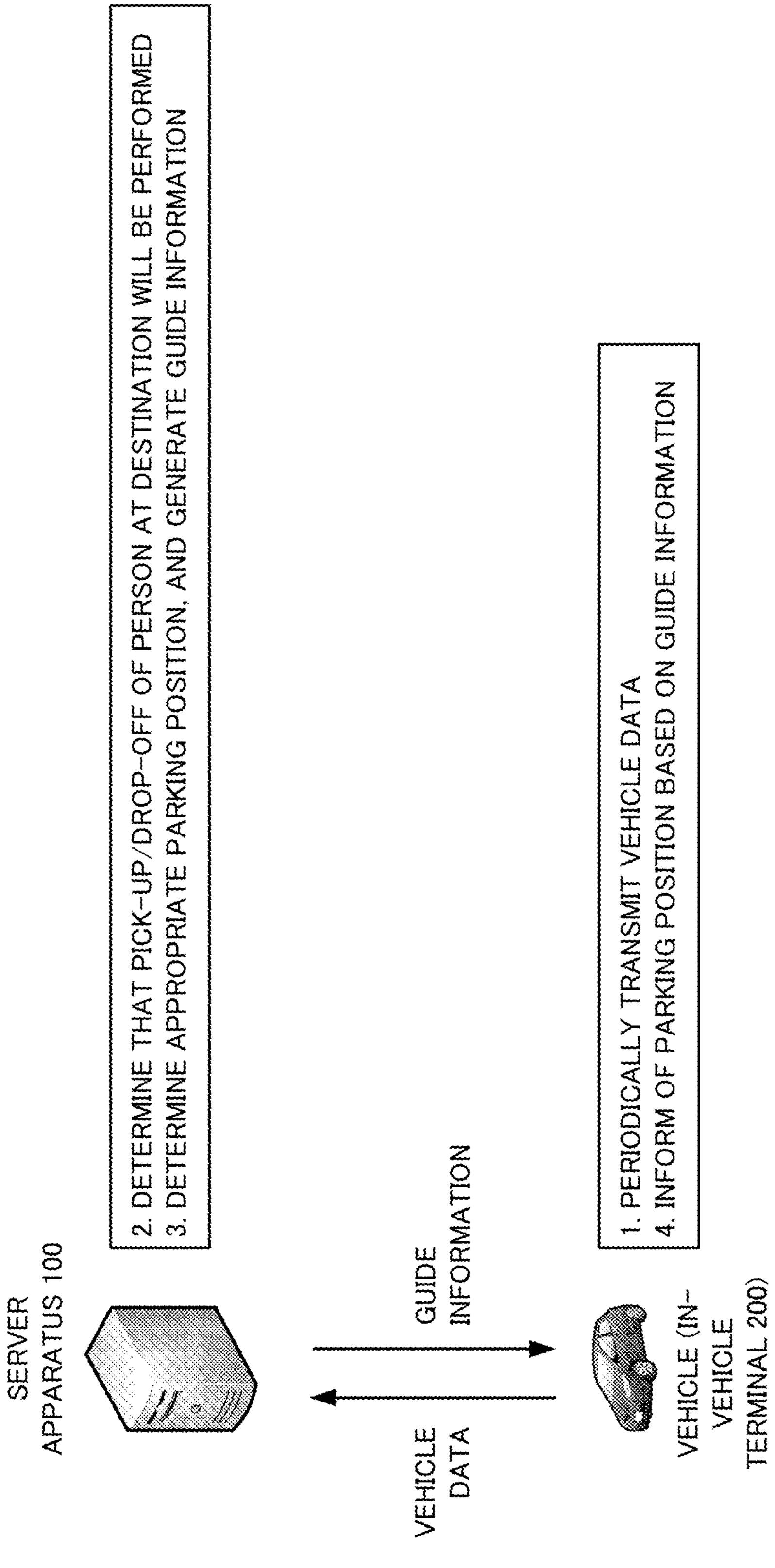
FIG. 1 is a diagram describing an outline of a navigation system.

An information processing apparatus according to an embodiment of the present disclosure is an apparatus that assigns a parking position on a road to a vehicle that is to be temporarily parked to pick up or drop off a person.

Vehicles are often parked on a road in a disorderly manner around a facility where a large number of vehicles gather for pick-up or drop-off, thereby causing obstruction to smooth flow of traffic.

To cope with such a situation, an information processing apparatus according to the present disclosure determines an appropriate parking position for a vehicle based on data that is transmitted from the vehicle.

An information processing apparatus includes a controller configured to receive vehicle data from a plurality of vehicles, specify a first vehicle, among the plurality of vehicles, that is predicted to be parked to pick up or drop off a person in a predetermined period of time, based on the vehicle data, make a determination, based on the vehicle data, whether the first vehicle is in a first state in which parking for pick-up of the person is predicted to be performed or a second state in which parking for drop-off of the person is predicted to be performed, and perform assignment of a parking position to the first vehicle based on a result of the determination.

In the case where a person is to be picked up or dropped off by a vehicle, a parking time is different depending on the purpose. For example, a vehicle that is dropping off a person may start moving immediately after drop-off is performed. By contrast, a vehicle that is to pick up a person has to stay parked until the target person comes. Accordingly, an appropriate parking position may be different depending on whether the vehicle is in the first state or the second state.

For example, in the case where the vehicle is in the second state, the vehicle is estimated to start moving in a short time, and obstruction to other traffic may be tolerated to a certain extent. By contrast, in the case where the vehicle is in the first state, parking at a place with smallest influence on other traffic is desirable.

As described above, by determining a desirable parking position for each vehicle based on the state of the vehicle, traffic control on a road may be performed. Additionally, the determined parking position may be provided to a target vehicle or to other vehicles in the vicinity of such vehicle.

Furthermore, the vehicle data may include the number of occupants in the vehicle, and the controller may determine whether the first vehicle is in the first state or the second state, based on the number of occupants.

A state may be determined by using the number of persons on board a vehicle. For example, in the case where the number of occupants is one, it can be estimated that a person is going to be picked up. Furthermore, in the case where the number of occupants is more than one, it can be estimated that a person is going to be dropped off.

Furthermore, the vehicle data may include the number of occupants in the vehicle, and information for identifying a destination of the first vehicle, and the controller may determine whether the first vehicle is in the first state or the second state, based on the destination and the number of occupants.

The information for identifying a destination of a vehicle may be an identifier of the destination itself, or indirect information for estimating the destination (such as an identifier of the vehicle, day of the week, a time slot, a travel area, a travel route and the like).

For example, in the case where there is prior information that “two persons are on board when dropping off a person, and one person is on board when picking up a person”, when the vehicle is heading to a destination, the state may be determined based on the destination and the number of occupants.

Furthermore, the controller may assign the parking position based on a degree of obstruction that the first vehicle that is parked imposes on other traffic.

Furthermore, in a case where the first vehicle is in the first state, the controller may assign, as the parking position, a place where the degree of obstruction is lower than in a case where the first vehicle is in the second state.

Furthermore, the information processing apparatus may further include a storage configured to store data describing the degree of obstruction on a per-parking position basis.

In the case where a vehicle is in the first state, the parking time is expected to be longer than in a case where the vehicle is in the second state, and a place with a lower degree of obstruction to other traffic is desirable as the parking position.

Furthermore, the controller may further estimate a destination of the first vehicle.

A state (such as the number of occupants in a vehicle) at the time of picking up or dropping off a person is possibly different on a per-destination basis. Accordingly, estimating a destination allows determination to be performed more appropriately.

Furthermore, the controller may perform the assignment in a case where the first vehicle is located near the destination of the first vehicle.

According to such a configuration, information may be provided at an appropriate timing.

Furthermore, in a case where the first vehicle is in the first state, the controller may assign, as the parking position, a place that is closer to the destination than in a case where the first vehicle is in the second state.

In the case of the first state, or in other words, in the case where a vehicle is to pick up a target person, the vehicle may be guided to a place that is closer to the destination such that the target person can easily find the vehicle.

Furthermore, in a case where a parking position is assigned to another vehicle that is located near the first vehicle, the controller may further transmit, to the first vehicle, information informing of the parking position that is assigned to the other vehicle.

Furthermore, in a case where a parking position is assigned to another vehicle with a same destination as the first vehicle, the controller may further transmit, to the first vehicle, information informing of the parking position that is assigned to the other vehicle.

According to such a configuration, a driver of the first vehicle may perceive whether another vehicle that is near the first vehicle will start moving in a short time or not.

Furthermore, the controller may transmit, to the first vehicle, guide information for informing of the parking position.

According to such a configuration, the driver of the first vehicle may be informed of an appropriate parking position.

Furthermore, the information processing apparatus may be further configured to be capable of communicating with a mobile terminal that is associated with the person who is to get on or off the vehicle, and the controller may acquire position information of each of the vehicle and the mobile terminal.

Furthermore, the controller may estimate a parking time of the first vehicle based on pieces of the position information that are acquired.

The mobile terminal may be a terminal that is carried by a target person who is to be picked up or dropped off by the vehicle, for example. By referring to the position information of each of the mobile terminal and the vehicle, a time until the vehicle that is parked starts moving may be estimated.

In the following, specific embodiments of the present disclosure will be described with reference to the drawings. Hardware configurations, module configurations, functional configurations and the like described in each embodiment are not intended to limit the technical scope of the disclosure unless stated otherwise.

First Embodiment

An outline of a navigation system according to a first embodiment will be described with reference to FIG. 1. The navigation system according to the present embodiment includes a server apparatus 100 that manages a plurality of regions on a road where a vehicle can be temporarily parked, and an in-vehicle terminal 200 that is mounted in the vehicle.

With the navigation system according to the present embodiment, a region on a road where a vehicle can be temporarily parked is managed as a "parking region". The parking region on a road is defined in advance by the system. The server apparatus 100 assigns a parking region to a vehicle and informs the vehicle of the same to thereby cause the vehicle to be parked at an appropriate parking position on the road. Moreover, a vehicle as a target to which the server apparatus 100 assigns a parking region will be referred to as a "target vehicle".

The server apparatus 100 is an apparatus that determines whether a vehicle that is being managed by the system is to be temporarily parked to pick up or drop off a person at a destination, and that informs the vehicle of an appropriate parking position.

There are many places on roads where vehicles can be parked. However, in a case where many vehicles gather at one place such as a school for pick-up or drop-off, traffic may be confused. Accordingly, the server apparatus 100 determines an appropriate parking position on a per-vehicle basis based on information collected from the in-vehicle terminal 200, and transmits information for informing of the determined parking position to the in-vehicle terminal 200 mounted in the target vehicle. The vehicle may thus be guided to an appropriate position, and traffic may be made smooth.

The in-vehicle terminal 200 is a computer that is mounted in each of a plurality of vehicles being managed. The in-vehicle terminal 200 acquires vehicle data from the subject vehicle, and periodically transmits the same to the server apparatus 100. In the present embodiment, the vehicle data is data used to determine (1) whether the vehicle is to be parked (to pick up or drop off a person) in a predetermined period of time, and (2) whether the purpose of the parking is to pick up the person or to drop off the person.

Figure 2:
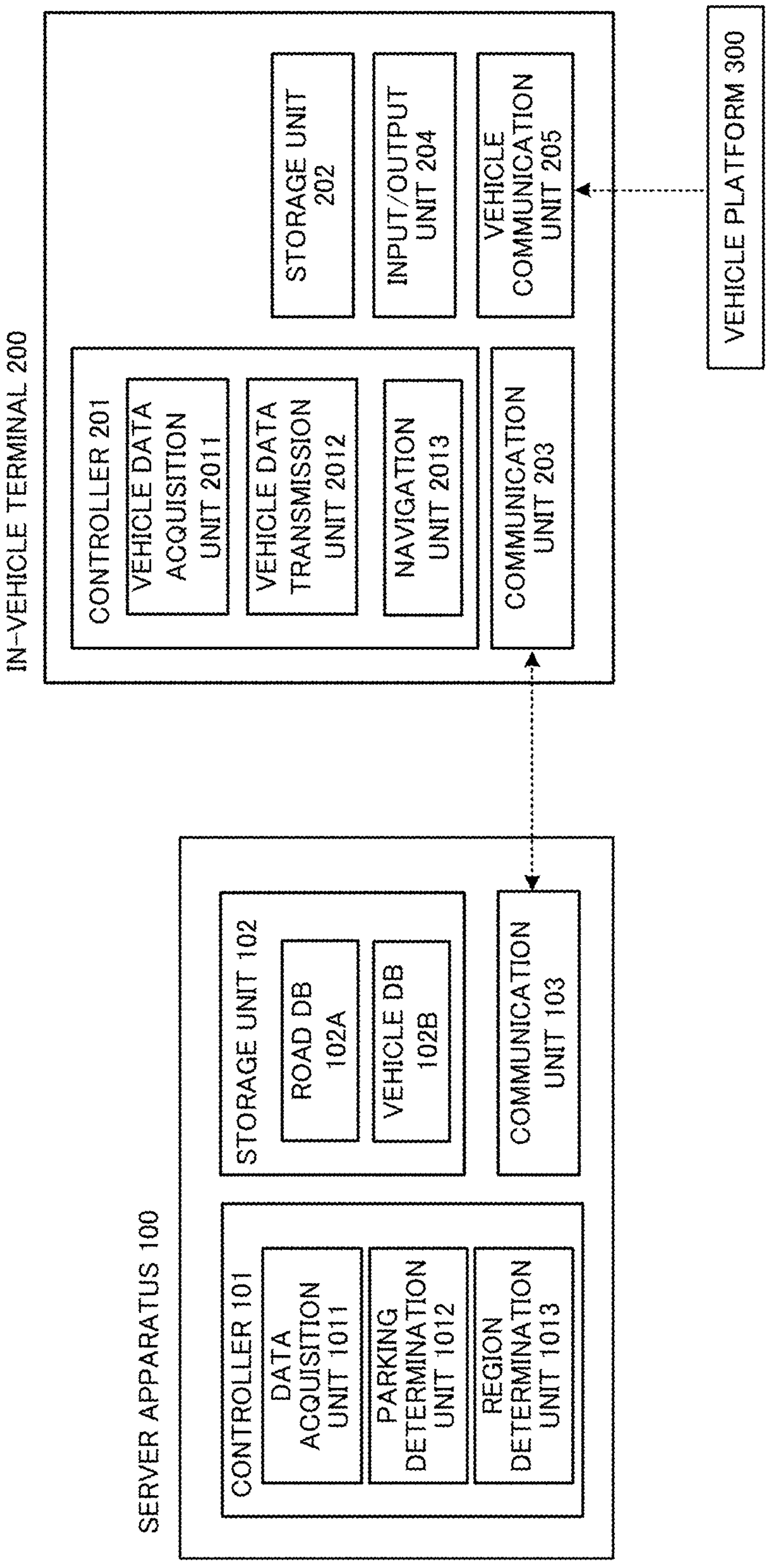
FIG. 2 is a diagram illustrating in greater detail structural elements of the navigation system.

FIG. 2 is a diagram illustrating in greater detail structural elements of the navigation system according to the present embodiment.

A vehicle platform 300 is a platform including a computer for controlling a vehicle (such as an engine ECU, a body ECU and the like). The vehicle platform 300 is capable of acquiring a plurality of pieces of sensor data obtained by performing sensing inside the vehicle.

The in-vehicle terminal 200 is a computer that is mounted in a vehicle. The in-vehicle terminal 200 includes a controller 201, a storage unit 202, a communication unit 203, an input/output unit 204, and a vehicle communication unit 205. The in-vehicle terminal 200 is capable of communicating with the server apparatus 100 and the vehicle platform 300.

The controller 201 is an arithmetic device that is in charge of control that is performed by the in-vehicle terminal 200. The controller 201 may be implemented by an arithmetic processing device such as a central processing unit (CPU).

The controller 201 includes three functional modules, namely, a vehicle data acquisition unit 2011, a vehicle data transmission unit 2012, and a navigation unit 2013. These functional modules may be implemented by the CPU executing programs that are stored in the storage unit 202 described later.

The vehicle data acquisition unit 2011 acquires data about the subject vehicle (hereinafter "vehicle data"). In the present embodiment, the vehicle data includes data indicating a current position of the vehicle, data about a destination of the vehicle, and data indicating the number of persons on board the vehicle (the number of occupants).

The data indicating a current position of the vehicle may be acquired from a GPS module or the like of the vehicle.

The data about a destination of the vehicle may be data directly indicating the destination (such as an identifier of the destination) or data for estimating the destination of the target vehicle. For example, a history of position information of the vehicle, a route traveled by the vehicle, information about a travel environment (date, day of the week, time slot, etc.) may be used. In the case where navigation to the destination is being provided by the navigation unit 2013, the vehicle data acquisition unit 2011 may acquire the information about a destination from the navigation unit 2013.

The number of persons on board the vehicle may be acquired from the vehicle platform 300. For example, in the case where the vehicle platform 300 includes seat sensors, seat belt sensors, an image sensor installed inside the vehicle and the like, the number of occupants may be determined based on sensor data pieces acquired from these sensors.

The vehicle data transmission unit 2012 periodically transmits the vehicle data acquired by the vehicle data acquisition unit 2011 to the server apparatus 100.

The navigation unit 2013 provides a navigation function to the driver of the vehicle. Specifically, a route guide, traffic information and the like are provided. The navigation unit 2013 may be capable of communicating with a unit (such as the GPS module) for acquiring the current position of the vehicle, and a unit (such as a communication module) for acquiring the traffic information from outside. These units may be provided in the vehicle or the in-vehicle terminal 200.

The storage unit 202 includes a main memory and an auxiliary memory. The main memory is a memory where programs to be executed by the controller 201, and data to be used by the control programs are developed. The auxiliary memory is a device that stores the programs to be executed by the controller 201, and the data to be used by the control programs. The auxiliary memory may store the programs to be executed by the controller 201 in the form of packaged applications. An operating system for executing the applications may also be stored. Processes described later are performed by the programs stored in the auxiliary memory being loaded into the main memory and being executed by the controller 201.

The storage unit 202 may also store data for providing the navigation function (road map data) and the like.

The main memory may include a random access memory (RAM) and a read only memory (ROM). Furthermore, the auxiliary memory may include an erasable programmable ROM (EPROM) and a hard disk drive (HDD). The auxiliary memory may further include a removable medium, or in other words, a removable recording medium.

The communication unit 203 is a wireless communication interface for connecting the in-vehicle terminal 200 to a network. For example, the communication unit 203 is capable of communicating with the server apparatus 100 by a wireless LAN or a mobile communication service such as 3G, LTE or 5G, for example.

The input/output unit 204 is a unit that receives an input operation performed by a user, and that presents information to the user. The input/output unit 204 is, in the present embodiment, one touch panel display. In other words, the input/output unit 204 includes a liquid crystal display and a control unit thereof, or a touch panel and a control unit thereof.

The vehicle communication unit 205 is an interface unit for communicating with the vehicle platform 300. The vehicle communication unit 205 is capable of acquiring the sensor data acquired by the vehicle platform 300, via an in-vehicle network.

Next, a description will be given of the server apparatus 100.

The server apparatus 100 performs a process of receiving the vehicle data from the in-vehicle terminal 200, and estimates, based on the received vehicle data, parking of the target vehicle for pick up or drop off a person in a predetermined period of time and a purpose of the parking (whether parking is for picking up a person or dropping off a person).

Furthermore, a place (a parking region) where the target vehicle is to be parked is determined based on the estimated purpose and the destination of the target vehicle, and information for informing of the same is transmitted to the in-vehicle terminal 200 mounted in the target vehicle.

The server apparatus 100 may be a general-purpose computer. That is, the server apparatus 100 may be a computer that includes processors such as a CPU, a GPU and the like, main memories such as RAM, ROM and the like, and auxiliary memories such as an EPROM, a hard disk drive, a removable medium and the like. The auxiliary memory stores an operating system (OS), various programs, various tables and the like, and each function matching a predetermined object as described later may be implemented by controlling each structural unit or the like through execution of a program stored in the auxiliary memory, by loading the program into a work area of the main memory and executing the same. However, the functions may be partially or wholly implemented by a hardware circuit such as an ASIC or an FPGA.

A controller 101 is an arithmetic device that is in charge of control that is performed by the server apparatus 100. The controller 101 may be implemented by an arithmetic processing device such as a CPU.

The controller 101 includes three functional modules, namely, a data acquisition unit 1011, a parking determination unit 1012, and a region determination unit 1013. Each functional module may be implemented by the CPU executing a program that is stored.

The data acquisition unit 1011 performs processes of acquiring the vehicle data from the in-vehicle terminal 200 that is mounted in a target vehicle that is being managed by the system, and of causing a storage unit 102 described later to store the acquired vehicle data.

The parking determination unit 1012 determines, based on the vehicle data that is stored, whether the target vehicle is to be parked in a predetermined period of time to pick up or drop off a person, and further determines whether the purpose of the parking is pick-up or drop-off.

A result of determination performed by the parking determination unit 1012 is transmitted to the region determination unit 1013.

The region determination unit 1013 assigns a parking region to the target vehicle based on the result of determination performed by the parking determination unit 1012 and the destination of the vehicle.

Now, the parking region will be described with reference to FIGS. 3A and 3B. A target facility in the drawings is a facility where many vehicles come for pick-up or drop-off. The target facility is typically, but not limited to, a school, an educational facility, a sports facility or the like. Many vehicles tend to gather around such a facility for pick-up or drop-off.

Figure 3A:
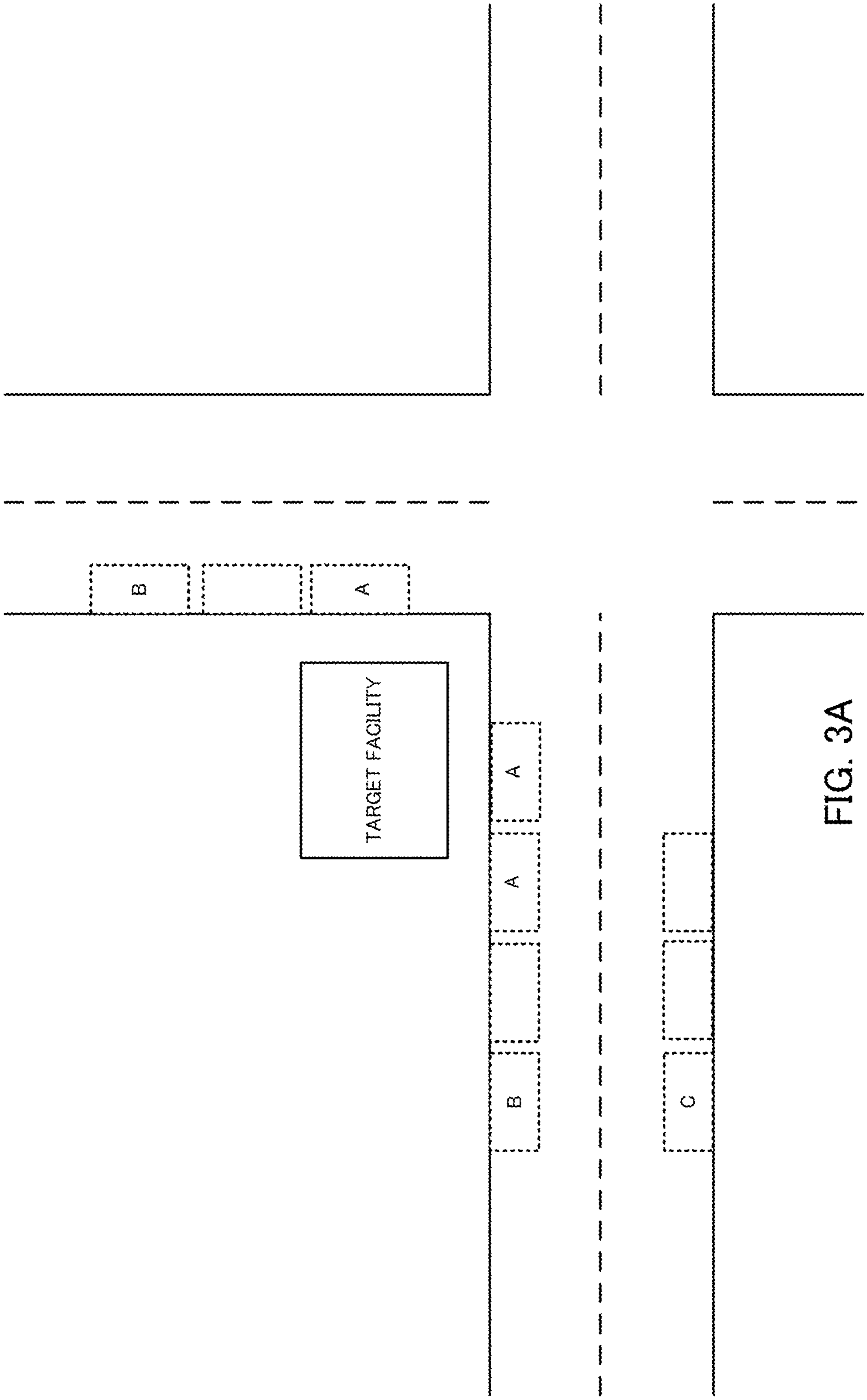
FIG. 3A is a diagram describing parking positions of vehicles.

In the example illustrated in FIG. 3A, users of the facility tend to park vehicles at positions close to the facility, as indicated by reference signs A. However, such a position is close to an intersection, and it is not desirable to park a vehicle for a long time to wait for a person. Accordingly, a vehicle that is to be parked to wait for a person is desirably guided to a position away from the intersection, as indicated by reference signs B or a reference sign C. However, such a way of coping is not applied to a vehicle that is to be parked to drop off a person because such a vehicle can start moving in a short time.

Figure 3B:
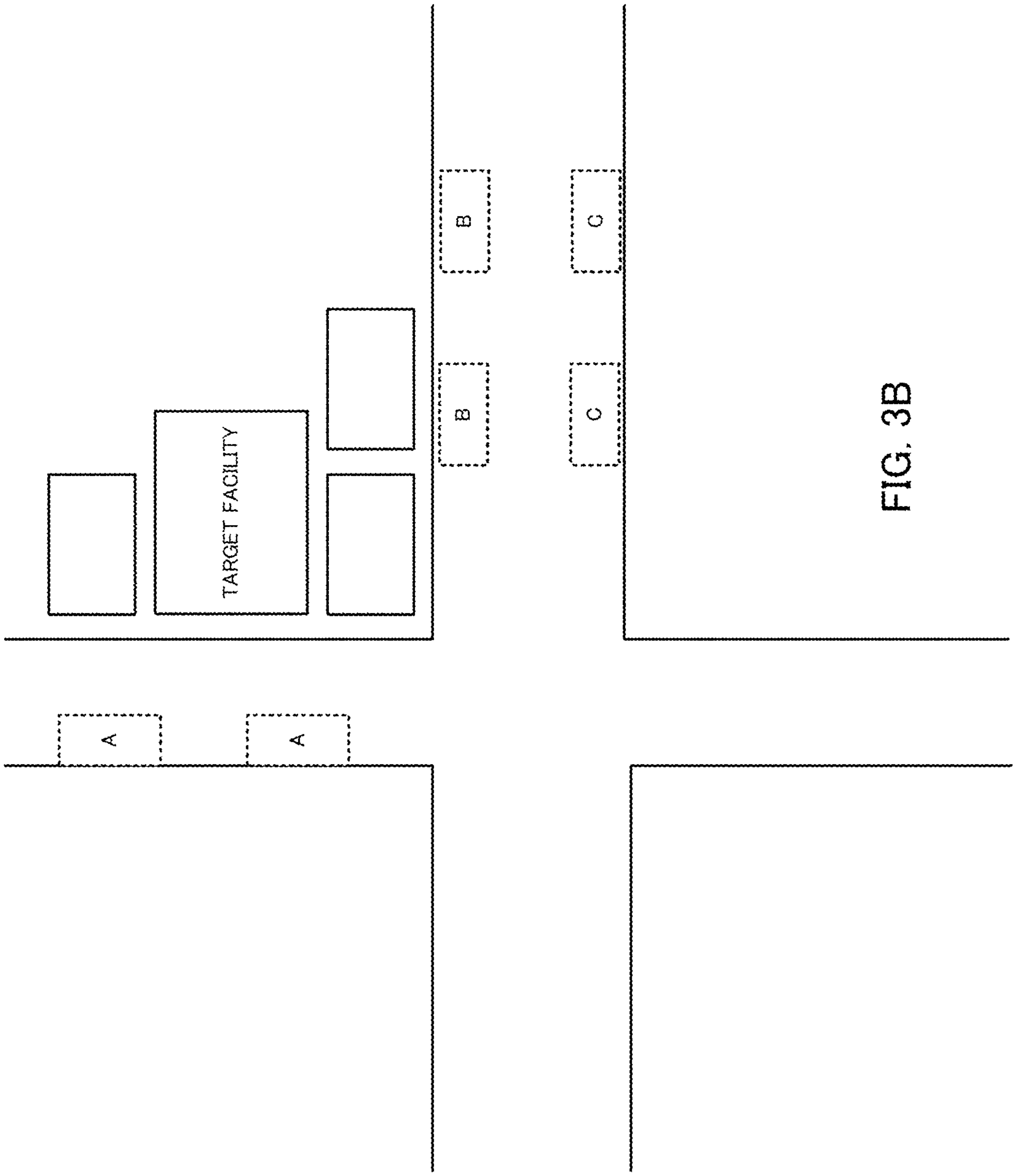
FIG. 3B is a diagram describing parking positions of vehicles.

Also in the example illustrated in FIG. 3B, users of the facility tend to park vehicles at positions close to the facility, as indicated by reference signs A. However, a road in front of the facility is narrow, and parking a vehicle for a long time may obstruct traffic. Accordingly, a vehicle that is to be parked to wait for a person is desirably guided to a wider road, as indicated by reference signs B and reference signs C.

As described above, an appropriate parking position of a vehicle is different depending on whether parking is for dropping off a person or for picking up a person.

The region determination unit 1013 determines, based on stored information, a region as a guide destination (the parking region) for each of a plurality of vehicles that are scheduled to pick up or drop off a person, and generates information for informing of the region. The generated information is transmitted to the in-vehicle terminal 200.

The storage unit 102 includes a main memory and an auxiliary memory. The main memory is a memory where programs to be executed by the controller 101, and data to be used by the control programs are developed. The auxiliary memory is a device that stores the programs to be executed by the controller 101, and the data to be used by the control programs.

The storage unit 102 further stores a road database 102A and a vehicle database 102B.

Figure 4:
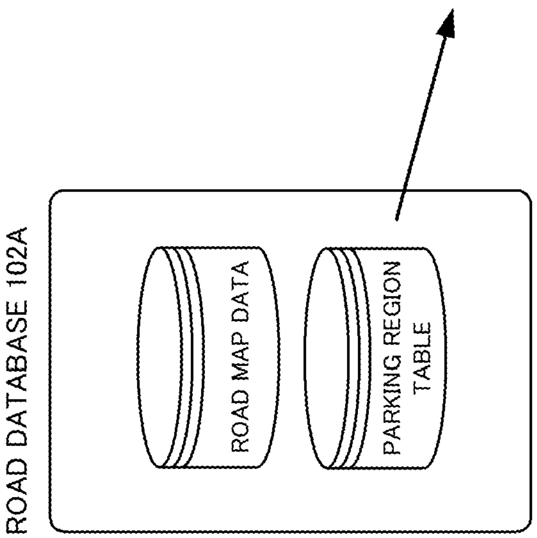
FIG. 4 is an example of a road database that is stored in a storage unit.

The road database 102A is a database that stores data about a road network. As illustrated in FIG. 4, the road database 102A includes digital map data (road map data) of roads where vehicles can travel, and a table (a parking region table) defining regions on roads where vehicles can be parked.

As illustrated, the parking region table stores an identifier of a parking region, position information of the parking region, an evaluation value for the parking region, and the like.

The evaluation value is a value indicating the level of influence that is exerted on smoothness of other traffic (vehicles, non-motorized vehicles, pedestrians, etc.) when a vehicle is parked in the target region. For example, a small evaluation value is given to a region where parking over a long time is not desirable, such as a region that is close to an intersection, that is close to a pedestrian crossing, that is close to a corner, or that is narrow. By contrast, a great evaluation value is given to a region that is not likely to influence smoothness of other traffic.

Figure 5:
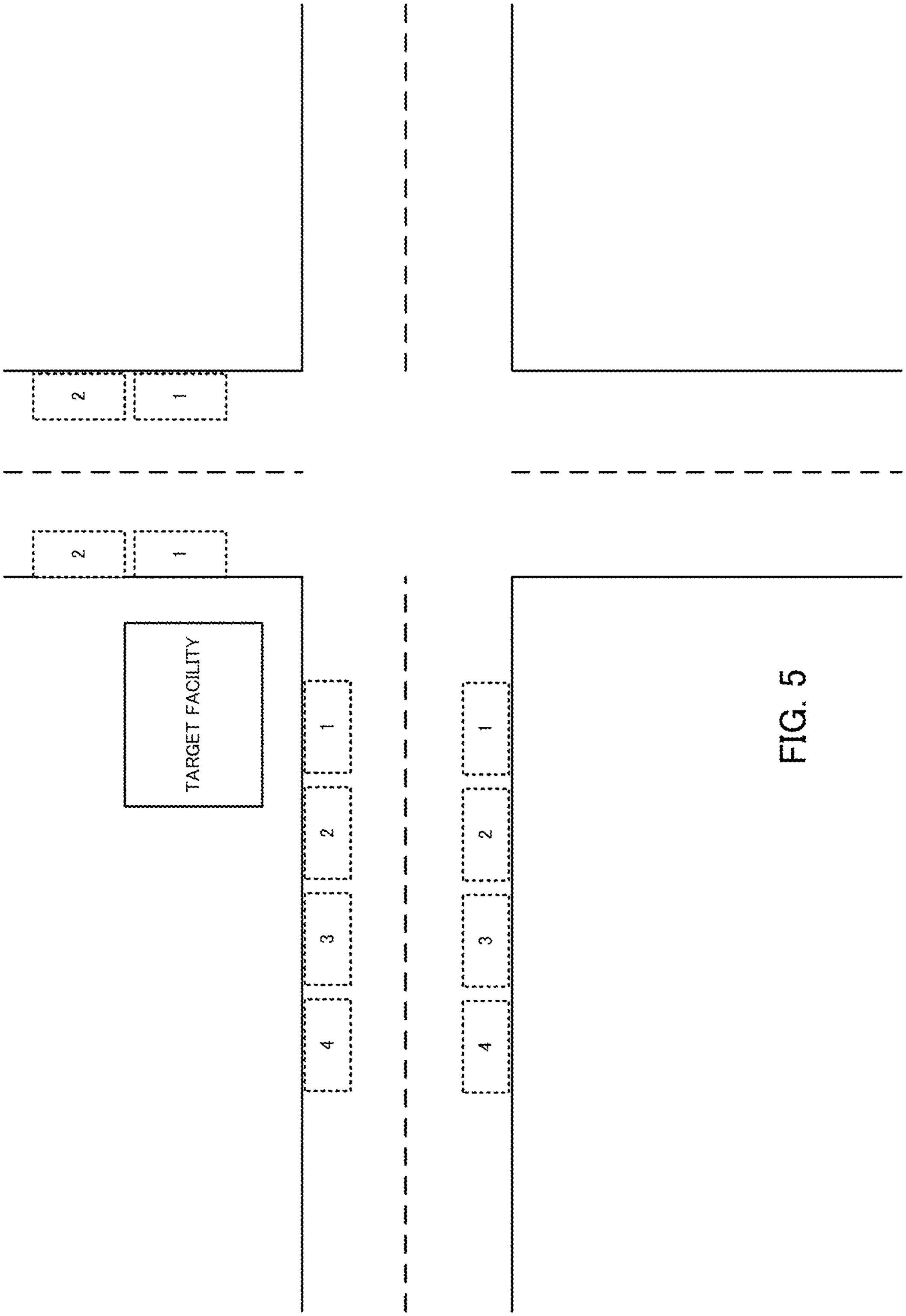
FIG. 5 is an example of an evaluation value that is given to each parking region.

FIG. 5 is an example of the evaluation value that is given to each parking region. In the present example, the closer the region is to the intersection, the smaller the evaluation value is.

By referring to the road database 102A, the region to which a vehicle that is to be parked to pick up or drop off a person is to be guided can be determined.

The vehicle database 102B is a database that stores data about a vehicle. As illustrated in FIG. 6, the vehicle database 102B includes a table (a vehicle information table) that records the vehicle data transmitted from a plurality of vehicles (the in-vehicle terminals 200), and a table (a pick-up/drop-off condition table) recording in advance information about pick-up and drop-off by each vehicle.

The vehicle information table is a table that stores the vehicle data. The table stores an identifier of a vehicle, the date/time of generation of the vehicle data, position information of the vehicle, information about a destination of the vehicle, the number of occupants obtained by sensing, and the like. The vehicle information table is updated as necessary based on the vehicle data that is periodically received from the in-vehicle terminal 200.

The pick-up/drop-off condition table is a table that stores data about details of pick-up and drop-off performed by a vehicle. The table stores in advance conditions for occurrence of pick-up/drop-off, a destination, an operation type, the number of persons on board the vehicle at the time of pick-up/drop-off, and the like.

A condition field stores the conditions for occurrence of pick-up/drop-off. For example, in the case where pick-up/drop-off is performed in a specific time slot on a specific day of the week, data indicating the corresponding day of the week and time slot is stored in the condition field.

A destination field stores the destination of pick-up/drop-off. The destination may be indicated by latitude and longitude, or by an ID that uniquely identifies a facility or the like. Additionally, in the case of a mode in which the server apparatus 100 is to estimate the destination of a vehicle based on the vehicle data, the server apparatus 100 may estimate the destination based on the vehicle data that is received, and store the estimated destination in the field.

An operation type field stores “drop-off” or “pick-up”. In the case where the field indicates “drop-off”, operation for dropping off a person is indicated. In the case where the field indicates “pick-up”, operation for picking up a person is indicated.

A number-of-occupants field stores the number of persons on board the vehicle. The number of persons on board a vehicle is usually different between when the operation type is “drop-off” and when the operation type is “pick-up”. Accordingly, the number of persons may be used for determination of the operation type by being defined in advance.

The road database 102A and the vehicle database 102B are structured by managing data stored in a memory by programs of a database management system (DBMS) that are executed by the processor. The road database 102A and the vehicle database 102B are each a relational database, for example.

A communication unit 103 is a communication interface for connecting the server apparatus 100 to a network. For example, the communication unit 103 includes a network interface board, and a wireless communication module for wireless communication.

Additionally, the configurations illustrated in FIG. 2 are only examples, and the illustrated functions may be partially or wholly performed by a dedicated circuit. Furthermore, programs may be stored and executed by a combination of a main memory and an auxiliary memory other than those illustrated.

Figure 7:
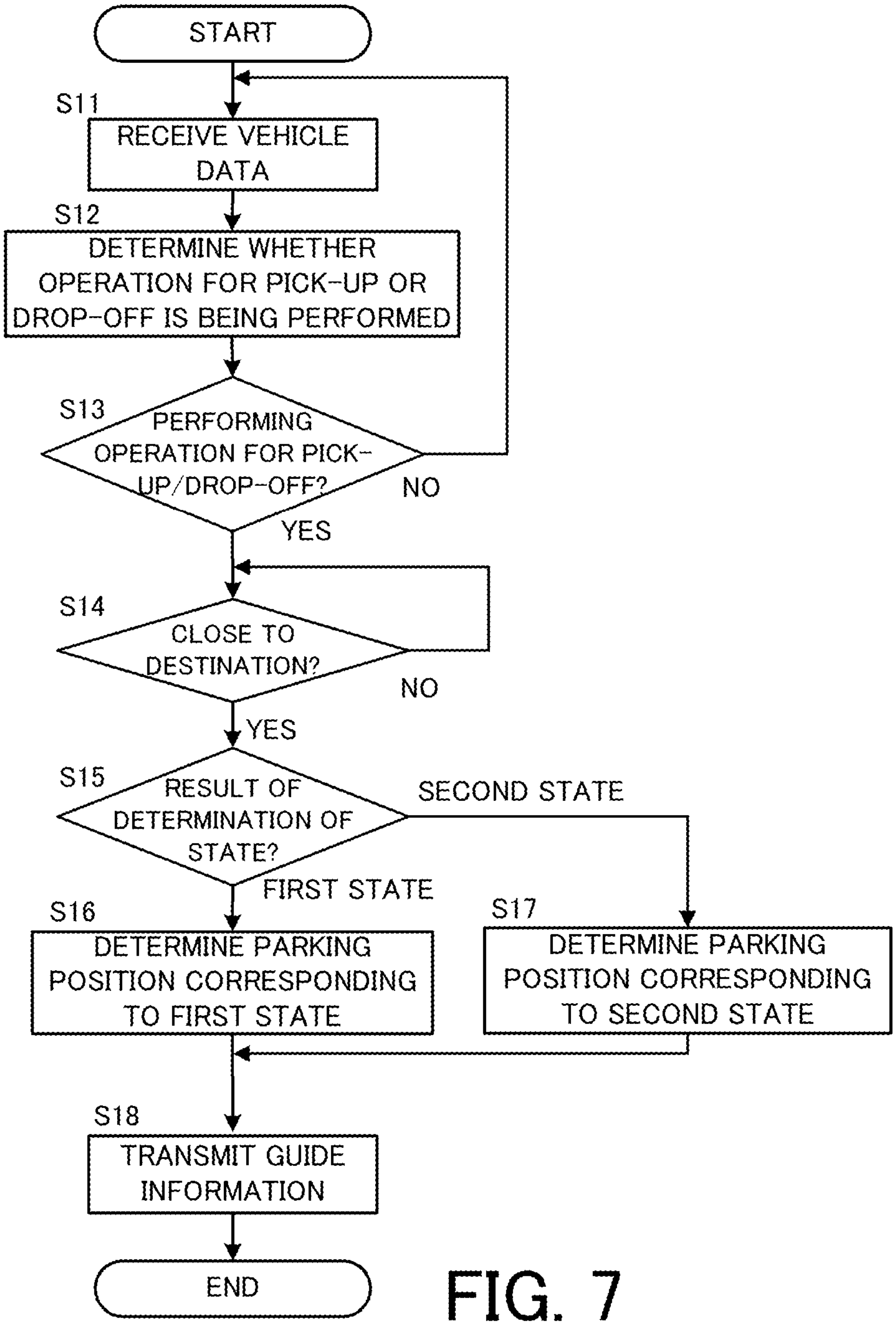
FIG. 7 is a flowchart of a process that is performed by a controller in a first embodiment.

FIG. 7 is a flowchart illustrating a process that is performed by the server apparatus 100. The flowchart illustrated in FIG. 7 is periodically performed during operation of the system, with each of a plurality of vehicles being managed as a target.

In step S11, the data acquisition unit 1011 receives the vehicle data from the in-vehicle terminal 200 mounted in a target vehicle. The vehicle data that is received is reflected in the vehicle database 102B.

Next, in step S12, the parking determination unit 1012 determines, based on the vehicle data that is acquired, whether the target vehicle is currently traveling to pick up or drop off a person.

In the present step, first, the pick-up/drop-off condition table is searched using the vehicle ID, and match/non-match of the obtained condition is determined.

In the example in FIG. 6, in the case where the date/time of generation of the vehicle data is between 16:00 and 16:59 on Tuesday, the target vehicle can be determined to be traveling to pick up or drop off a person. Here, in the case where the state of the target vehicle is determined to be “performing operation for pick-up/drop-off” (step S13: Yes), the process proceeds to step S14. In other cases (step S13: No), the process returns to step S11.

In step S14, whether the target vehicle is close to the destination is determined. In the case where a positive determination is made in the present step, the process proceeds to step S15. In the case where a negative determination is made in the present step, the process is performed again after a predetermined period of time. This is because, if a guide pointing to a parking region is issued in a state where the destination is not close, the parking region is possibly used by another vehicle.

In step S15, the parking determination unit 1012 determines whether a result of determination of a state is “first state” or “second state”.

The first state is a state in which the target vehicle is estimated to be parked to pick up a person in a predetermined period of time. A vehicle in the first state is expected to be parked for a certain period of time to wait for pick-up.

The second state is a state in which the target vehicle is estimated to be parked to drop off a person in a predetermined period of time. A vehicle in the second state is expected to be parked for a short time to drop off a person.

In the example in FIG. 6, for example, in the case where the date/time of generation of the vehicle data is 19:30 on Tuesday, and one person is on board the target vehicle, the target vehicle can be determined to be on its way to pick up a person (i.e., in the first state).

Furthermore, in the case where the date/time of generation of the vehicle data is 16:30 on Tuesday, and two persons are on board the target vehicle, the target vehicle can be determined to be on its way to drop off a person (i.e., in the second state).

Here, in the case where the determination result is “first state”, the process proceeds to step S16.

In step S16, the region determination unit 1013 determines the parking position corresponding to the first state. In the case where the target vehicle is in the first state, a parking region that is within a predetermined range of the destination of the target vehicle and that has an evaluation value (that is, the degree of obstruction to other traffic) that is smaller than a predetermined threshold is determined as the parking region for the target vehicle.

In the case where the determination result is "second state", the process proceeds to step S17.

In step S17, the region determination unit 1013 determines the parking position corresponding to the second state. In the case where the target vehicle is in the second state, a parking region that is within the predetermined range of the destination of the target vehicle and that has an evaluation value that is greater than the predetermined threshold is determined as the parking region for the target vehicle.

That is, in the case where the target vehicle is in the first state, the region determination unit 1013 determines, as the parking region, a place with a lower degree of obstruction to other traffic than in the case where the target vehicle is in the second state.

Additionally, in the case where there is a region where a vehicle is already parked, among candidate parking regions, such a region may be excluded. Whether or not a vehicle is currently parked in a parking region being managed may be determined by referring to the vehicle information table.

In step S18, the region determination unit 1013 generates guide information for informing of the determined parking region, and transmits the guide information to the in-vehicle terminal 200. The guide information is output via the input/output unit 204 of the in-vehicle terminal 200.

Figure 8:
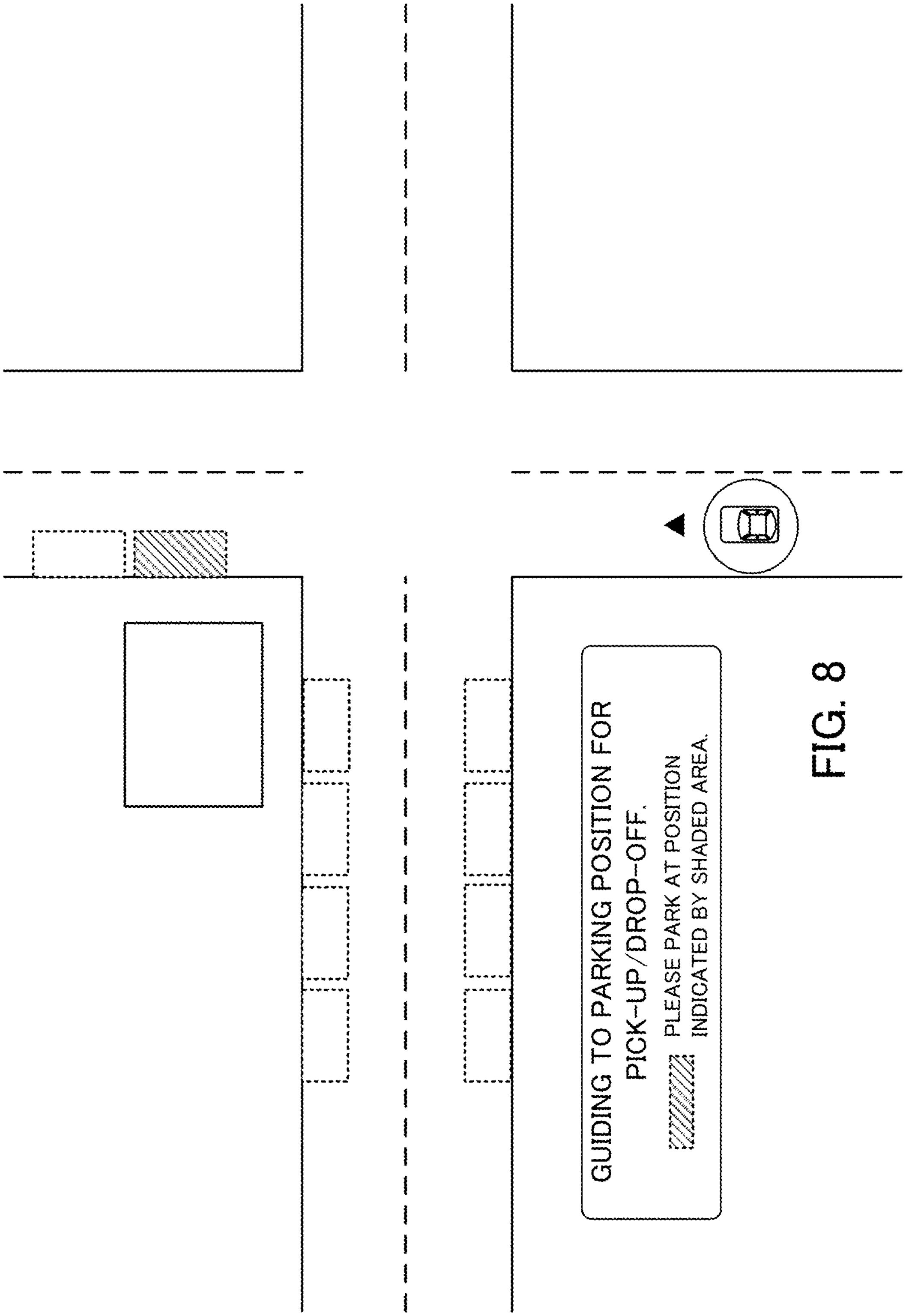
FIG. 8 is an example of an interface screen that is presented in the first embodiment.

As illustrated in FIG. 8, the guide information may be an image where the position of the parking region that is assigned is mapped on a map. Additionally, generation of the image may be performed by the server apparatus 100 or by the in-vehicle terminal 200.

In the case of the former, the server apparatus 100 may transmit the image after mapping to the in-vehicle terminal 200, and the in-vehicle terminal 200 may output the same. In the case of the latter, the server apparatus 100 transmits data indicating details of the parking region to the in-vehicle terminal 200, and the in-vehicle terminal 200 may perform mapping based on the data and generate the image.

As described above, the server apparatus 100 according to the first embodiment determines, based on the vehicle data received from the in-vehicle terminal 200, whether the target vehicle is to be parked with the purpose of picking up or dropping off a person in a predetermined period of time. Furthermore, whether the purpose of parking is pick-up or drop-off is estimated, and the position where the vehicle should be parked is informed of based on the estimation result. According to such a configuration, the vehicle may be guided to a more appropriate position depending on the length of a parking time, and smoothness of traffic may be enhanced.

Additionally, in the first embodiment, an evaluation value is given to the parking region based on the degree of obstruction to other traffic, but the evaluation value may alternatively be given based on other criteria.

Figure 9A:
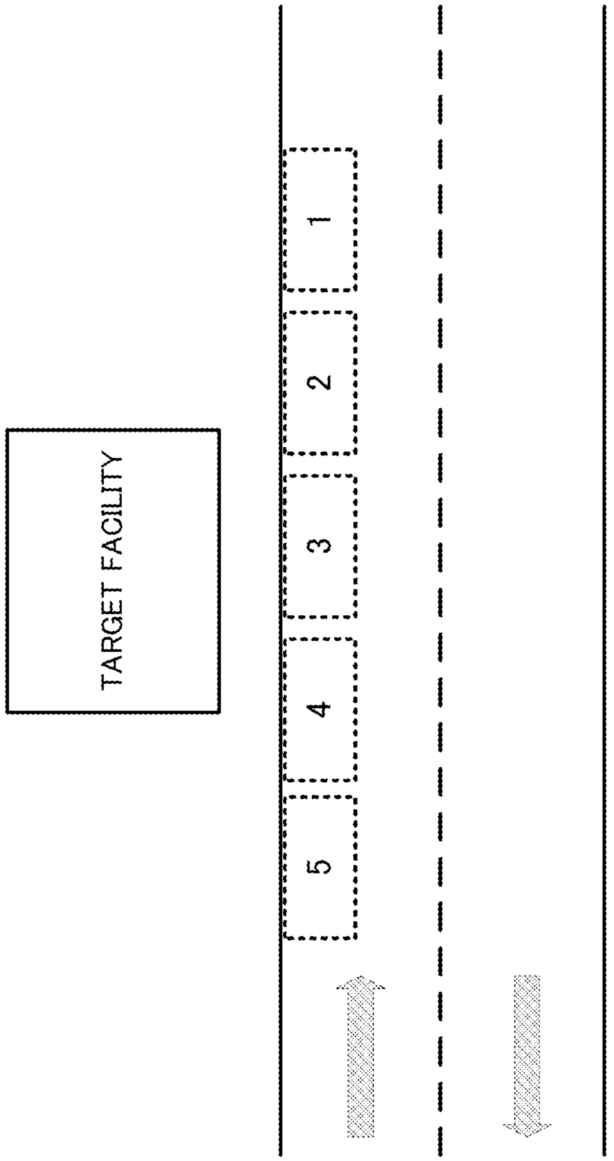
FIG. 9A is a second example of the evaluation value that is given to each parking region.

For example, as illustrated in FIG. 9A, the evaluation value may be assigned to each parking region in such a way that the longer the vehicle is to be parked, the more rearward in a travel direction the vehicle is parked. According to such a mode, an effect that a following vehicle can be more easily parked is obtained.

Figure 9B:
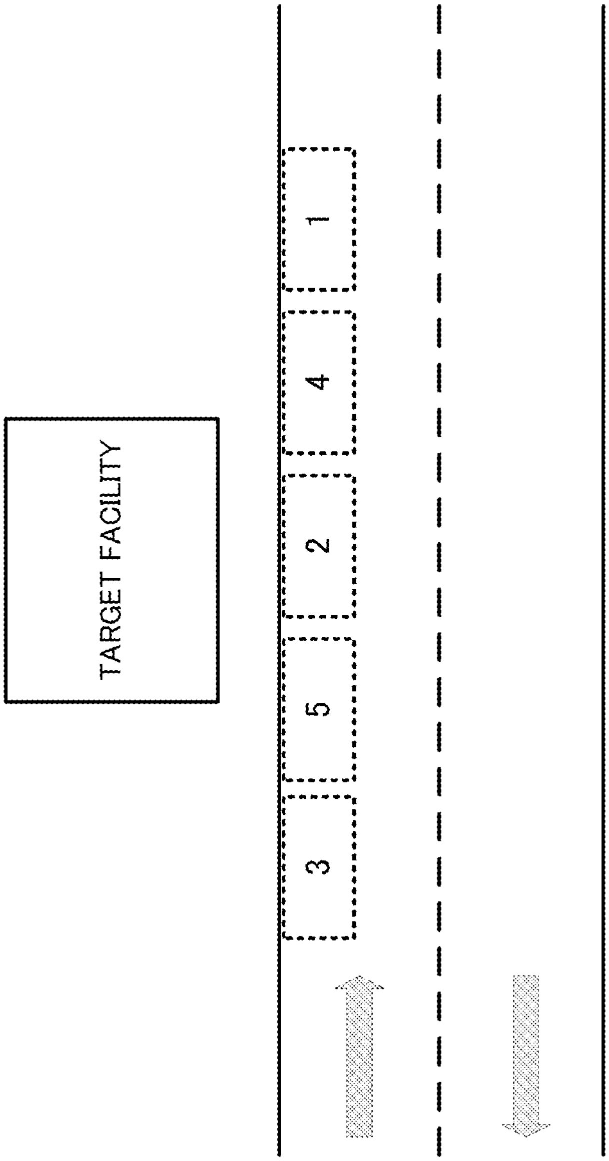
FIG. 9B is a third example of the evaluation value that is given to each parking region.

Furthermore, as illustrated in FIG. 9B, parking regions with great evaluation values and parking regions with small evaluation values may be alternately arranged. According to such a mode, vehicles in the first state and vehicles in the second state may be alternately arranged, and concentration of vehicles may be avoided.

Figure 9C:
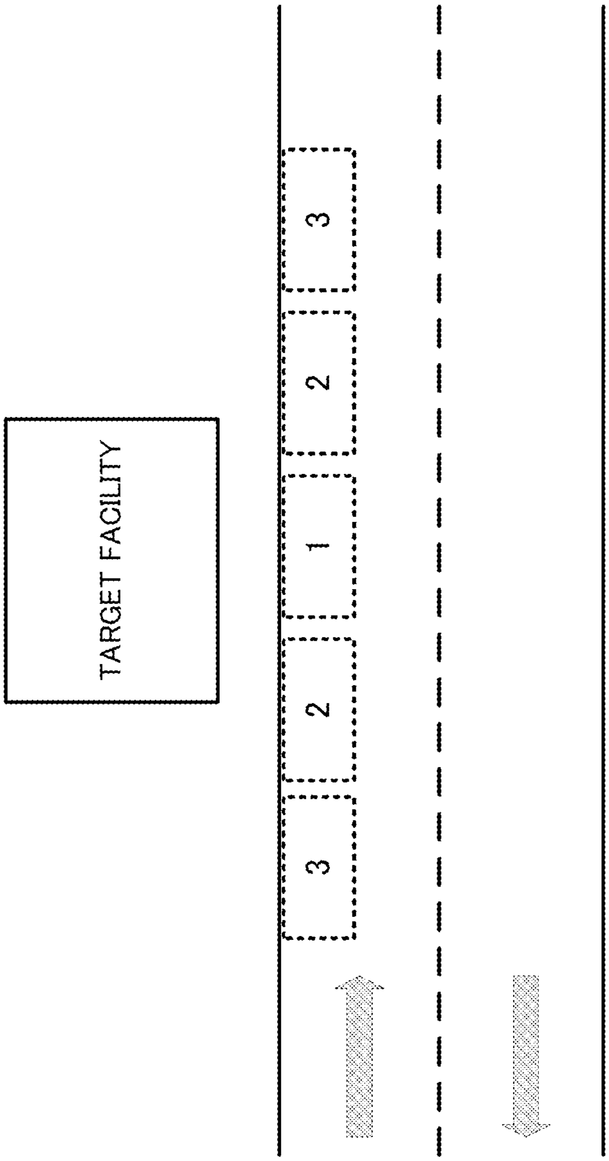
FIG. 9C is a fourth example of the evaluation value that is given to each parking region.

Moreover, as illustrated in FIG. 9C, a smaller evaluation value may be given to a parking region that is closer to the destination. According to such a mode, a vehicle for picking up a person may be guided to a position that is closer to the target facility, and smooth boarding may be enabled.

Furthermore, in the first embodiment, processes from step S15 are started when the target vehicle nears a vicinity of the destination, but alternatively, the process in step S18 may be started under the condition that the target vehicle is close to the vicinity of the destination.

Second Embodiment

In the first embodiment, information informing only of the parking region that is assigned to the target vehicle is transmitted to the target vehicle. By contrast, a second embodiment is an embodiment in which information about another vehicle that is located around the target vehicle and that has the same destination as the target vehicle is further transmitted to the target vehicle.

In the second embodiment, in step S18, the server apparatus 100 generates the guide information further including information about another vehicle with the same destination.

Figure 10:
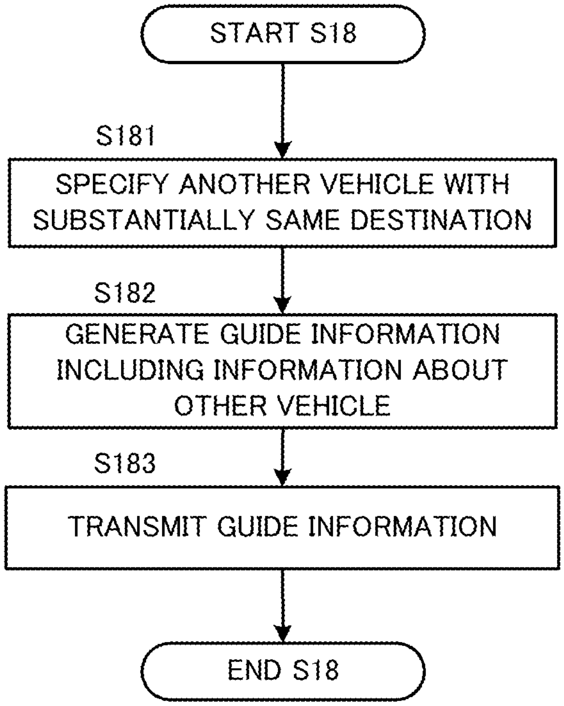
FIG. 10 is a flowchart of a process that is performed by a controller in a second embodiment.

FIG. 10 is a flowchart describing the process in step S18 in the second embodiment.

First, in step S181, another vehicle with substantially the same destination as the target vehicle (the destinations are the same or close enough to be considered the same destination) is specified. The term "(an) other vehicle" refers to a vehicle that is to be parked to pick up or drop off a person in the vicinity of the destination of the target vehicle in a same time slot. The other vehicle may be a vehicle that separately receives the guide information from the server apparatus 100. Moreover, there may be a plurality of other vehicles.

Next, in step S182, guide information including information about the other vehicle is generated. That is, in the present step, guide information including both (1) information for informing of the parking region assigned to the subject vehicle and (2) information for informing of the parking region that is assigned to the other vehicle is generated.

Then, in step S183, the guide information that is generated is transmitted to the target vehicle.

Figure 11:
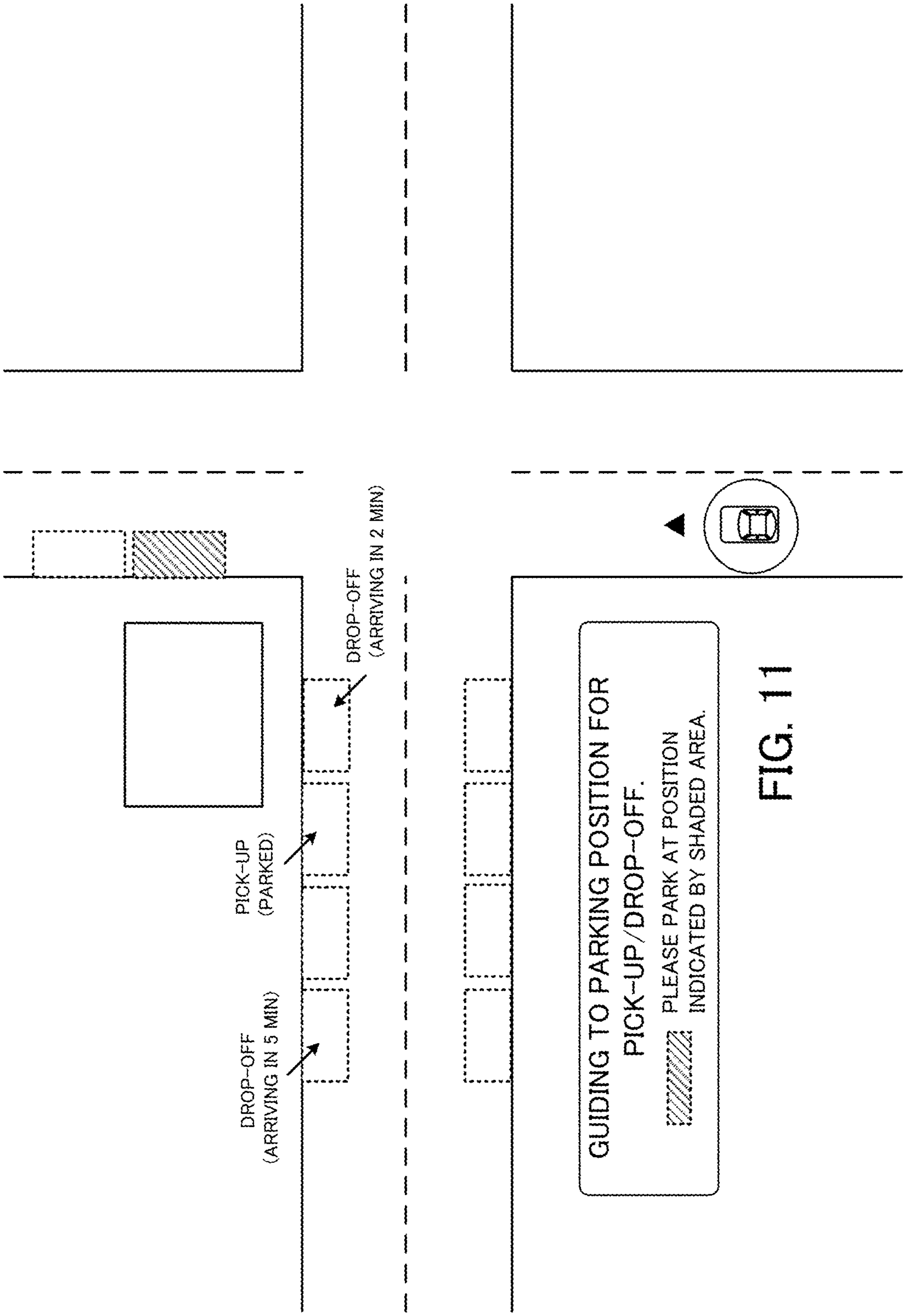
FIG. 11 is an example of an interface screen that is presented in the second embodiment.

FIG. 11 is a diagram illustrating an example of the guide information in the second embodiment. As illustrated, the guide information includes information indicating to which one of a plurality of parking regions another vehicle in the first state or the second state is assigned.

For example, in the case where another vehicle in the first state is assigned to a parking region, a graphic image for informing that a vehicle for pick-up is assigned to the region is generated. Furthermore, in the case where another vehicle in the second state is assigned to a parking region, a graphic image for informing that a vehicle for drop-off is assigned to the region is generated.

Additionally, in the case where the vehicle that is assigned to the parking region has not yet arrived at the actual location, an arrival time may be predicted. For example, it is also possible to notify the driver of the target vehicle that "vehicle for drop-off will arrive in two minutes".

According to the second embodiment, an occupant of the target vehicle may be notified of whether a plurality of parking regions near the destination of the target vehicle are assigned to other vehicles or not. The occupant of the target vehicle may thus grasp arrival/departure of vehicles on the road.

Third Embodiment

A third embodiment is an embodiment in which a departure time of a vehicle that is parked in a parking region is further estimated.

Figure 12:
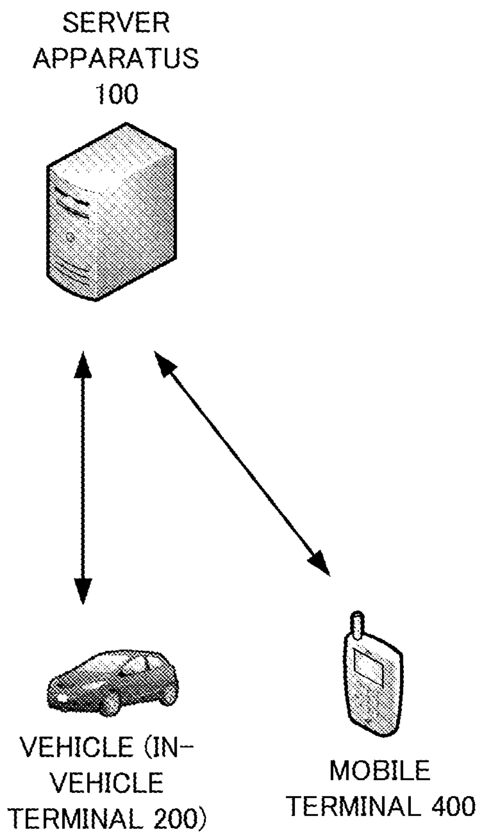
FIG. 12 is a diagram describing an outline of a navigation system according to a third embodiment.

As illustrated in FIG. 12, a navigation system according to the third embodiment further includes a mobile terminal 400. The mobile terminal 400 is a terminal (such as a smartphone) that is carried by a person (hereinafter "target person") who is to be picked up or dropped off by a vehicle. The server apparatus 100 is capable of communicating with each of the in-vehicle terminal 200 and the mobile terminal 400.

The mobile terminal 400 includes a function of periodically transmitting position information to the server apparatus 100. The server apparatus 100 stores an association between the mobile terminal 400 and the in-vehicle terminal 200, and estimates a departure time of the associated vehicle based on the position information that is received.

FIG. 13 is an example of a pick-up/drop-off condition table in the third embodiment. As illustrated, in the third embodiment, a mobile terminal ID field is added to the pick-up/drop-off condition table. An identifier of the mobile terminal 400 that is carried by the target person who is to be picked up or dropped off by a vehicle is stored in this field.

Figure 14:
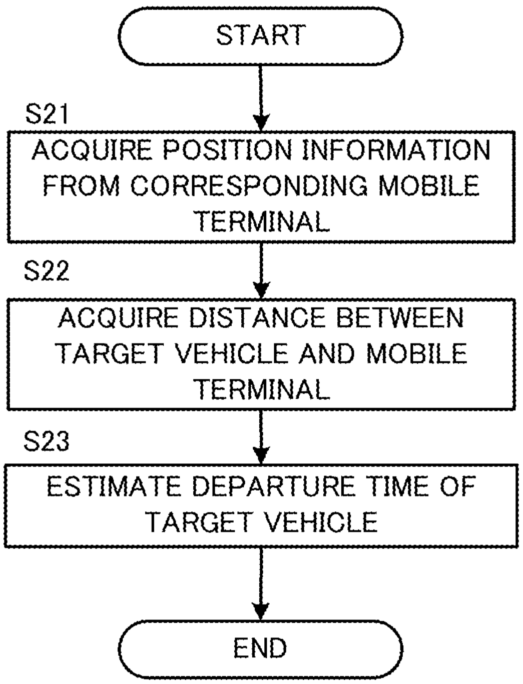
FIG. 14 is a flowchart of a process that is performed by a controller in the third embodiment.

In the third embodiment, the server apparatus 100 performs a process illustrated in FIG. 14 after the target vehicle is parked in an assigned parking region.

First, in step S21, the mobile terminal 400 that is associated with the target vehicle is specified, and position information is acquired from the mobile terminal 400. The identifier of the mobile terminal 400 that is associated with the target vehicle may be acquired by referring to the pick-up/drop-off condition table.

Next, in step S22, a relative distance between the mobile terminal 400 and the target vehicle is acquired. Specifically, the relative distance between the two is calculated by referring to the position information that is acquired from the mobile terminal 400 and the position information that is included in the vehicle data transmitted from the corresponding in-vehicle terminal 200.

Then, in step S23, the departure time of the target vehicle is estimated based on the relative distance that is acquired.

For example, in the case where the target vehicle is in the first state, and the relative distance acquired in step S22 is below a threshold (such as 20 meters), the target person may be determined to get on the vehicle for pick-up shortly. Furthermore, in the case where the target vehicle is in the second state, and the relative distance acquired in step S22 exceeds a threshold (such as 5 meters), the target person may be determined to be out of the vehicle.

That is, the departure time of the target vehicle (in other words, a remaining time until departure of the target vehicle) may be estimated based on such a determination result. Additionally, in the case where the relative distance does not satisfy the threshold, the departure time may be assumed to be "unknown".

The processes between steps S21 and S23 may be repeatedly performed until the relative distance satisfies a predetermined threshold or the target vehicle starts moving.

The server apparatus 100 may notify other vehicles that are located in the vicinity of the target vehicle of the estimated departure time. Drivers of other vehicles may thus grasp when the vehicle that is currently parked in the vicinity is going to start moving.

Furthermore, the server apparatus 100 may generate a notification for the target person with satisfaction of a predetermined condition by the relative distance as a trigger. For example, a notification indicating arrival of the vehicle for pick-up may be issued to the mobile terminal 400 when the relative distance falls below a predetermined value (such as 100 meters).

(Modifications)

The embodiments described above are merely examples, and the present disclosure may be implemented with appropriate changes made within the scope of the disclosure.

For example, processes and units described in the present disclosure may be freely combined to the extent that no technical conflict exists.

Furthermore, in the description of the embodiments, the evaluation value for each parking region is defined in advance in the database, but alternatively, the degree of obstruction that a parked vehicle imposes on other traffic may be calculated as necessary. For example, a real-time status of traffic around the destination may be acquired, and the evaluation value for each parking region may be calculated taking the status of traffic into account.

Moreover, in the description of the embodiments, a parking region that is a rectangular region is defined, but a closed region does not necessarily have to be defined as long as a position where a vehicle is to be parked on a road can be specified.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer via a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), read only memories (ROM), random access memories (RAM), EPROMS, EEPROMs, magnetic cards, flash memories, optical cards, and any type of medium suitable for storing electronic instructions.

What is claimed is:

1. An information processing apparatus comprising a controller configured to:

receive vehicle data from a plurality of vehicles, specify a first vehicle, among the plurality of vehicles, that is predicted to be parked to pick up or drop off a person in a predetermined period of time, based on the vehicle data, make a determination, based on the vehicle data, whether the first vehicle is in a first state in which parking for pick-up of the person is predicted to be performed or a second state in which parking for drop-off of the person is predicted to be performed, and perform assignment of a parking position to the first vehicle based on a result of the determination.

2. The information processing apparatus according to claim 1, wherein the vehicle data includes the number of occupants in the vehicle, and the controller determines whether the first vehicle is in the first state or the second state, based on the number of occupants.

3. The information processing apparatus according to claim 1, wherein the vehicle data includes the number of occupants in the vehicle, and information for identifying a destination of the first vehicle, and the controller determines whether the first vehicle is in the first state or the second state, based on the destination and the number of occupants.

4. The information processing apparatus according to claim 1, wherein the controller assigns the parking position based on a degree of obstruction that the first vehicle that is parked imposes on other traffic.

5. The information processing apparatus according to claim 4, wherein, in a case where the first vehicle is in the first state, the controller assigns, as the parking position, a place where the degree of obstruction is lower than in a case where the first vehicle is in the second state.

6. The information processing apparatus according to claim 4, further comprising a storage configured to store data describing the degree of obstruction on a per-parking position basis.

7. The information processing apparatus according to claim 1, wherein the controller further estimates a destination of the first vehicle.

8. The information processing apparatus according to claim 7, wherein the controller performs the assignment in a case where the first vehicle is located near the destination of the first vehicle.

9. The information processing apparatus according to claim 7, wherein in a case where the first vehicle is in the first state, the controller assigns, as the parking position, a place that is closer to the destination than in a case where the first vehicle is in the second state.

10. The information processing apparatus according to claim 7, wherein in a case where a parking position is assigned to another vehicle with a same destination as the first vehicle, the controller further transmits, to the first vehicle, information informing of the parking position that is assigned to the another vehicle.

11. The information processing apparatus according to claim 1, wherein the controller transmits, to the first vehicle, guide information for informing of the parking position.

12. The information processing apparatus according to claim 1, wherein the information processing apparatus is further configured to be capable of communicating with a mobile terminal that is associated with the person who is to get on or off the vehicle, and the controller acquires position information of each of the vehicle and the mobile terminal.

13. The information processing apparatus according to claim 12, wherein the controller estimates a parking time of the first vehicle based on pieces of the position information that are acquired.

14. An information processing system comprising a plurality of in-vehicle apparatuses mounted in a plurality of vehicles, respectively, and a server apparatus, wherein the in-vehicle apparatuses each include a first controller configured to transmit vehicle data to the server apparatus, and output information that is received from the server apparatus, and the server apparatus includes a second controller configured to receive the vehicle data from the in-vehicle apparatus, specify a first vehicle, among the plurality of vehicles, that is predicted to be parked to pick up or drop off a person in a predetermined period of time, based on the vehicle data, make a determination, based on the vehicle data, whether the first vehicle is in a first state in which parking for pick-up of the person is predicted to be performed or a second state in which parking for drop-off of the person is predicted to be performed, perform assignment of a parking position to the first vehicle based on a result of the determination, and transmit a result of the assignment to the in-vehicle apparatus.

15. The information processing system according to claim 14, wherein the vehicle data includes the number of occupants in the vehicle, and the second controller determines whether the first vehicle is in the first state or the second state, based on the number of occupants.

16. The information processing system according to claim 14, wherein the vehicle data includes the number of occupants in the vehicle, and information for identifying a destination of the first vehicle, and the second controller determines whether the first vehicle is in the first state or the second state, based on the destination and the number of occupants.

17. The information processing system according to claim 14, wherein the first controller maps the parking position that is assigned on a map, and outputs the map.

18. An information processing method comprising:

receiving vehicle data from a plurality of vehicles;

specifying a first vehicle, among the plurality of vehicles, that is predicted to be parked to pick up or drop off a person in a predetermined period of time, based on the vehicle data;

making a determination, based on the vehicle data, whether the first vehicle is in a first state in which parking for pick-up of the person is predicted to be performed or a second state in which parking for drop-off of the person is predicted to be performed; and performing assignment of a parking position to the first vehicle based on a result of the determination.

19. The information processing method according to claim 18, wherein the vehicle data includes the number of occupants in the vehicle, and information for identifying a destination of the first vehicle, and whether the first vehicle is in the first state or the second state is determined based on the destination and the number of occupants.

20. A non-transitory computer readable storing medium recording a computer program for causing a computer to perform the information processing method according to claim 18.

* * * * *